US012407403B2

(12) United States Patent
Michel et al.

(10) Patent No.: US 12,407,403 B2
(45) Date of Patent: Sep. 2, 2025

(54) METHOD OF ALLOCATION IN AN ON-BOARD DATA TRANSMISSION NETWORK IN A MOBILE PASSENGER TRANSPORT VEHICLE AND ASSOCIATED COMPUTER PROGRAM

(71) Applicant: THALES, Courbevoie (FR)

(72) Inventors: François Michel, Merignac (FR);
Pierre Harambillet, Merignac (FR);
Pierre Boullet, Merignac (FR)

(73) Assignee: THALES, Courbevoie (FR)

( * ) Notice: Subject to any disclaimer, the term of this patent is extended or adjusted under 35 U.S.C. 154(b) by 514 days.

(21) Appl. No.: 17/973,265

(22) Filed: Oct. 25, 2022

(65) Prior Publication Data

US 2023/0126393 A1   Apr. 27, 2023

(30) Foreign Application Priority Data

Oct. 27, 2021   (FR) ..................................... 21 11406

(51) Int. Cl.
*H04B 7/185*   (2006.01)
*H04W 16/22*   (2009.01)
(Continued)

(52) U.S. Cl.
CPC ...... *H04B 7/18506* (2013.01); *H04W 16/225* (2013.01); *H04W 24/02* (2013.01); *H04W 72/53* (2023.01); *H04W 84/12* (2013.01)

(58) Field of Classification Search
CPC .............. H04B 7/18506; H04W 72/53; H04W 16/225; H04W 24/02; H04W 84/12
See application file for complete search history.

(56) References Cited

U.S. PATENT DOCUMENTS 6,636,737 B1   10/2003   Hills et al.
2006/0280201 A1   12/2006   Hammel et al.
(Continued)

FOREIGN PATENT DOCUMENTS

| CN | 114448490 A | * | 5/2022 | ......... H04B 7/18502 |
|---|---|---|---|---|
| EP | 1 182 897 |  | 2/2002 |  |
| WO | WO-2005029278 A2 | * | 3/2005 | ............ H04W 16/00 |

OTHER PUBLICATIONS

French Search Report dated Jun. 1, 2022, for FR 2111406, 2 pp.

*Primary Examiner* — Joseph E Avellino
*Assistant Examiner* — Maryam Emadi
(74) *Attorney, Agent, or Firm* — NIXON & VANDERHYE (57) ABSTRACT

The present invention relates to an allocation method in a transmission network on-board a mobile vehicle, the network comprising wireless access points configured for transmitting and receiving, over a functioning channel, radio signals between said access point and a plurality of terminals.
The method comprising the following steps:
  provision of a digital model of the mobile vehicle and of the access points;
  for every available channel and for every access point, simulation of the propagation of signals from said access point on said available channel;
  for every available channel, for every access point and for every terminal, determination of an estimated associated bandwidth according to the simulation;
  allocation of one of the available channels and one of the access points to every terminal according to the estimated bandwidths.

12 Claims, 4 Drawing Sheets

(51) Int. Cl.
*H04W 24/02* (2009.01)
*H04W 72/53* (2023.01)
*H04W 84/12* (2009.01)

(56) References Cited

U.S. PATENT DOCUMENTS

2015/0103685 A1\* 4/2015 Butchko ............... H04L 41/147
                                                                                    455/67.14
2023/0021462 A1\* 1/2023 Valenza ............. H04B 17/3913

\* cited by examiner

METHOD OF ALLOCATION IN AN ON-BOARD DATA TRANSMISSION NETWORK IN A MOBILE PASSENGER TRANSPORT VEHICLE AND ASSOCIATED COMPUTER PROGRAM

CROSS-REFERENCE TO RELATED APPLICATION(S)

This application claims priority to FR 21 11406 filed Oct. 27, 2021, the entire contents of which are hereby incorporated by reference.

FIELD OF THE INVENTION

The present invention relates to a method of allocation in an on-board data transmission network in a mobile vehicle for passenger transport.

The invention further relates to a computer program associated with such an allocation method.

The mobile vehicle is in particular, an aircraft suitable for carrying passengers in a cabin.

BACKGROUND

Systems which allow passengers to connect from their cell phones, tablets or computers to an on-board Wi-Fi network are known, mainly on-board long-haul commercial aviation aircraft. Hereinafter, a Wi-Fi network is a network which complies with all IEEE 802.11 standards.

The Wi-Fi network gives access to the Internet network via a satellite connection or via a ground-based antenna. Same is referred to as "IFC" ("In Flight Connectivity").

The Wi-Fi network also provides access to content (movies, music, games) stored in a server on-board the aircraft. Same refers to "Wireless IFE" ("Wireless In Flight Entertainment").

In a manner known per se, such an IFE system comprises a plurality of entertainment terminals, further called user terminals, generally in the form of individual screens or tablets. Every entertainment terminal is integrated e.g. into the passenger seat or into the seat in front of the passenger. Every entertainment terminal is, as a variant, a digital tablet or a smart phone.

Thus arranged, the entertainment terminals allow passengers to consult multimedia contents during the flight (e.g. films, TV programs, games or music) and to be informed about the course of the flight (altitude, speed, current position, progress, etc.).

In some cases, the entertainment terminals can be further used for giving certain practical information relating e.g. to the airport of arrival and for broadcasting announcements made by the crew in audio and/or video form.

The Wi-Fi network consists of equipment, in particular WAP (Wireless Access Point) equipment The terminal of every passenger is connected at a given time to a single WAP which provides the passenger with the data link. A WAP serves some of the passengers in the cabin. The number of WAPs and the locations thereof depend on the type of aircraft: a single-aisle aircraft has 3 WAPs, or 4 WAPs, and in general, a long-haul double-aisle aircraft has 6 WAPs. WAPs are typically installed between the cabin ceiling and the aircraft skin, generally close to the aircraft centerline.

However, the metallic cabin environment and connection density (one user terminal per seat) severely limits the bandwidth available for every passenger equipment item. Furthermore, a communication between two user terminals necessarily goes through a WAP device.

And yet, the Wi-Fi network was not designed for a dense environment, in other words a large number of customers in a small space, which is the case of an aircraft passenger cabin. In a cabin, in order to avoid interference, only one channel can be used at a given time between a WAP and a Wi-Fi customer, i.e. two WAPs cannot use the same channel at a given time.

Moreover, the latest Wi-Fi standards use high frequency carriers (between 5 GHz and 7 GHz) which are sensitive to the masking by seats and luggage compartments. Thus, the reception of the Wi-Fi signal is variably good depending on the respective position of the WAP and of the Wi-Fi customer (tablet, phone, computers, etc.). Thus, there is a large disparity in the speeds accessible depending on the seat where the passenger is located.

The two phenomena of interference and masking make it difficult to distribute a satisfactory speed to a whole cabin, e.g. an average speed greater than 2 Mbit/s per passenger.

Thus, given such constraints, the number of users of a Wi-Fi network on-board an aircraft is limited. In fact, connectivity (IFC) offers for passengers are often paying, which greatly limits the number of users. There are, however, free connectivity offers or wireless IFE. In such case, the number of users is larger, but remains limited. Moreover, the uses are often divided between Internet browsing and messaging with low bandwidth consumption (<500 Kbit/s) and streaming which draws consumption (>2 Mbit/s). If the demand becomes too high on the Wi-Fi network, the bandwidth available for every passenger decreases resulting in a decrease in the quality of the passenger's experience with e.g. a low-resolution transition for streaming and a slow-down in Internet browsing.

In order to assign the different access points and channels available to the different Wi-Fi customers, the allocation of channels and WAP to the customers is usually static. Reallocations are made if a Wi-Fi customer breaks the link thereof to the WAP and requests to re-link. It is thus possible that the same channel is used by a large number of users while another channel is not saturated. Moreover, a user can be connected to a WAP located at the other end of the aircraft and hence with a deeply masked signal while the user could be connected to an unmasked WAP closer to the user.

To try to overcome such problem, Wi-Fi communication systems implementing dynamic allocation management are known, e.g. by measuring the speed at every WAP in operation and proposing regular reallocation of customers according to such measurements. Such a dynamic allocation of channels and WAP improves the availability of the Wi-Fi network for users but does not give full satisfaction because the allocation does not take into account the particularities of the environment of every cabin, in particular the configuration of the aircraft, the masking areas and the location of the different customers. Moreover, such an allocation method does not guarantee a minimum bandwidth for passengers. Finally, such a method does not provide a differentiated policy amongst customers e.g. by ensuring a minimum speed for business class passengers on a commercial aircraft.

There is thus a need to obtain an allocation method which can address the above-listed issues, in particular providing a better allocation of the different channels and available wireless access points, taking into account the particularities of the mobile vehicle.

SUMMARY

To this end, the invention relates to an allocation method in a data transmission network on-board a mobile vehicle for passenger transport, the mobile vehicle preferentially being an aircraft, the transmission network comprising a plurality of wireless access points, each access point being configured for transmitting and receiving, on one functioning channel, a plurality of available channels, radio signals between said access point and a plurality of terminals on-board the mobile vehicle, the allocation method comprising the following steps:

provision of a digital model of the mobile vehicle and of the access points;

for each available channel and for each access point, simulation with the digital model of the propagation of radio signals in the mobile vehicle from said access point on said available channel;

for each available channel, for each access point and for each terminal, determination of an estimated bandwidth associated with the communication between said access point and said terminal on said channel according to the simulation associated with said access point and said channel;

allocation of one of the available channels and one of the access points to each terminal according to the bandwidths estimated using an optimization algorithm.

According to other advantageous aspects of the invention, the allocation method comprises one or a plurality of the following features, taken individually or according to all technically possible combinations:

each wireless access point is configured for communicating with devices according to the Wi-Fi protocol.

each terminal is chosen from the group consisting of: a fixed entertainment terminal of the mobile vehicle and a portable electronic device;

the communication network comprises at least one computer system chosen from the group consisting of: a communication system with an antenna arranged outside the mobile vehicle and a multimedia server on-board the mobile vehicle;

the mobile vehicle comprises a cabin suitable for accommodating passengers, the numerical model comprising: a three-dimensional modeling of the cabin layout and the materials used in the cabin and a wave diagram associated with each access point and with each terminal;

the optimization algorithm comprises the application of a degradation coefficient to each estimated bandwidth, the degradation coefficient being a function of the number of terminals connected to the access point associated with said estimated bandwidth;

the optimization algorithm applies an optimization criterion chosen from the group consisting of:
  maximizing the average bandwidth for all terminals;
  maximizing the average bandwidth for all terminals assuming one of the access points is down;
  guaranteeing a minimum bandwidth for a predetermined subset of terminals and then maximizing the average bandwidth for all terminals;
  maximizing the average bandwidth for all terminals with a predetermined maximum standard deviation;

the simulation step is carried out: on a computer placed outside the mobile vehicle, all the estimated bandwidths being stored on a memory on-board the mobile vehicle; and/or on a computer on-board the mobile vehicle;

the optimization algorithm is executed by means of a machine learning method trained on a database comprising the estimated bandwidths and advantageously the bandwidths measured in the mobile vehicle.

The invention further relates to a computer program comprising software instructions which, when executed by a computer, implement a method as defined above.

BRIEF DESCRIPTION OF THE DRAWINGS

The features and advantages of the invention will appear upon reading the following description, given only as an example, and making in reference to the enclosed drawings, wherein.

DETAILED DESCRIPTION

Figure 1:
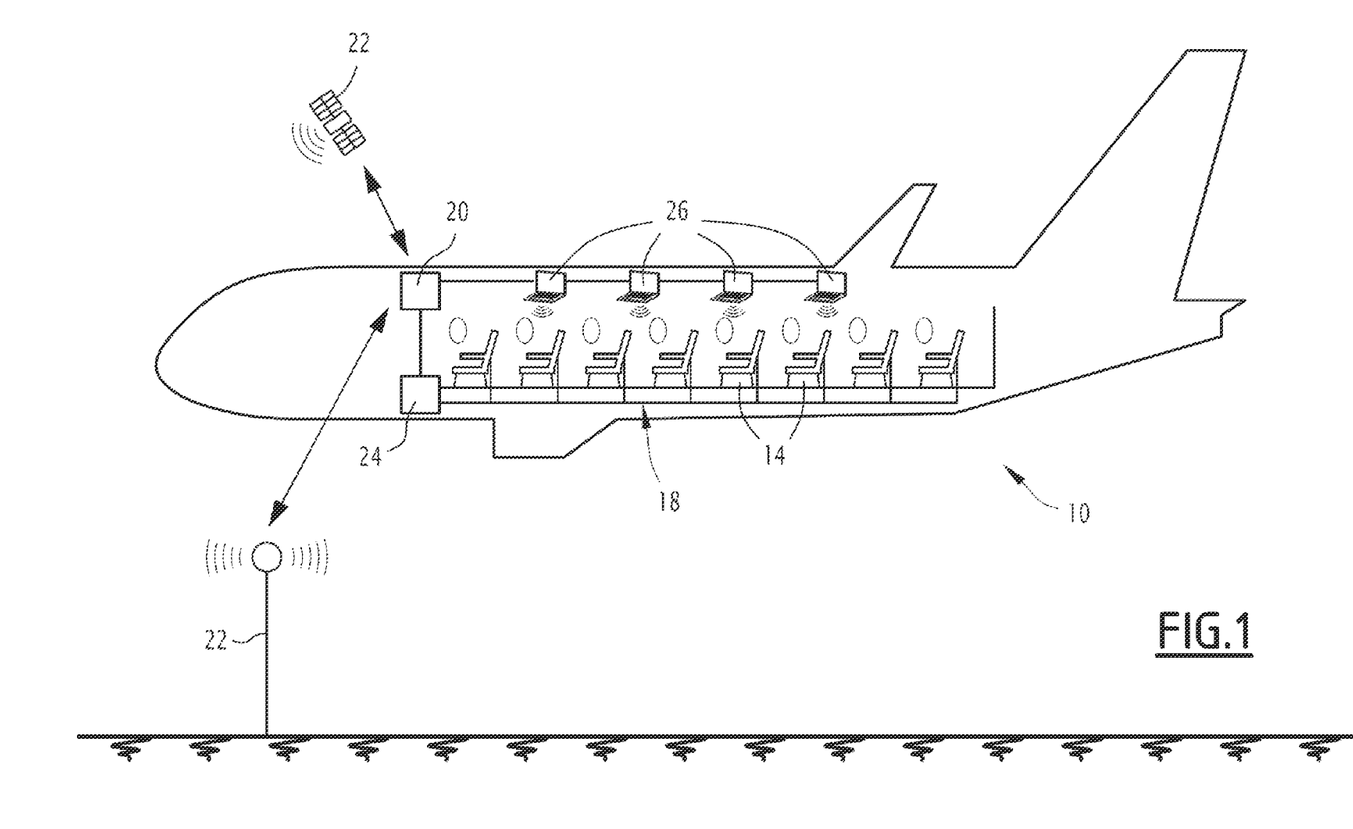
FIG. 1 is a schematic representation of a mobile vehicle comprising a data transmission network.

A mobile vehicle 10 is shown in FIG. 1.

The mobile craft 10 is configured to carry passengers, in particular a few dozen passengers, or even a few hundred passengers.

The mobile vehicle 10 is herein an aircraft, in particular a commercial aviation aircraft, such as a long-haul aircraft.

The present invention is described below in the particular case of an aircraft. However, a person skilled in the art would understand that the present invention applies to any means of transporting passengers such as a railway vehicle, a boat, a motor vehicle, a bus, a submarine, etc.

Figure 2:
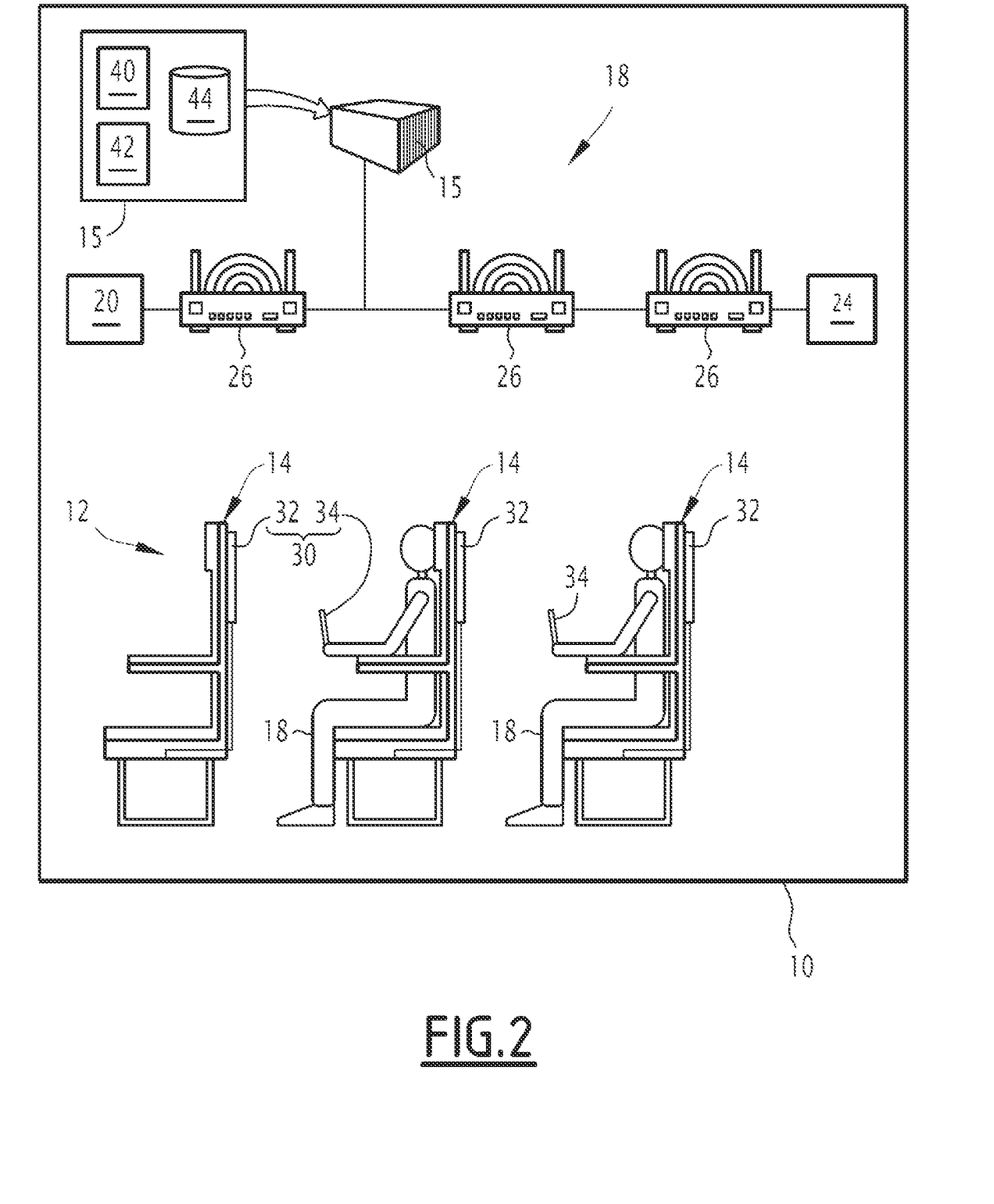
FIG. 2 is a schematic representation of the cabin of the mobile vehicle shown in FIG. 1, and of the transmission network.

As can be seen in FIGS. 1 and 2, the mobile vehicle 10 comprises a cabin 12 wherein are arranged a plurality of seats 14 for passengers 16.

The mobile vehicle 10 further comprises a data transmission network 18.

The transmission network 18 comprises a communication system 20 with at least one antenna 22 arranged outside the mobile vehicle 10 and/or a multimedia server 24 on-board the mobile vehicle 10.

As can be seen in FIG. 1, the antenna 22 is e.g. a satellite or a ground-based antenna. The communication system 20 is suitable for sending or receiving data from the antennas 22 and in particular can be used for connecting the transmission network 18 to the Internet network. The communication system 20 provides an IFC (In Flight Connectivity).

The multimedia server 24 is configured for storing entertainment content and for communicating the entertainment content to the passengers 16 via the network 18. The multimedia server 24 comprises e.g. films, TV programs, games or music, and/or information on the course of the flight (altitude, speed, current position, progress, etc.

As can be seen in FIG. 2, the network 18 comprises a controller 15 and a plurality of wireless access points 26. The access points 26 are arranged in the cabin 12 of the mobile vehicle 10 and are advantageously distributed along the mobile vehicle 10.

A plurality of terminals 30 are on-board in the mobile vehicle 10.

Each terminal 30 is in particular a fixed entertainment terminal 32 of the mobile vehicle 10 or a portable electronic device 34.

Each access point 26 is configured for transmitting and receiving, on a functioning channel assigned by the controller 15 among a plurality of available channels, radio signals between said access point 26 and the terminals 30.

In particular, each access point 26 is suitable for functioning on a functioning channel of the allocated frequency band. The functioning channel is adjustable and assigned dynamically by the controller 15 to the access point 26.

Advantageously, each wireless access point 26 is configured for communicating with the terminals 30 according to the Wi-Fi protocol, conforming to at least one of the versions of the IEEE 802.11 standard. The frequency of the carrier of the waves exchanged according to the Wi-Fi protocol is advantageously comprised between 5 GHz and 7 GHz.

Thus, each access point 26 is suitable for establishing a temporary Wi-Fi link with one of the terminals 30, when this terminal 30 is located inside a coverage cell associated with the access point 26 in question.

The coverage cells of the different access points 26 overlap, at least two by two, so as to cover, bit by bit, most of or even the entire cabin 12.

As shown in FIG. 2, each entertainment terminal 32 is known per se and comprises in particular, a display screen, preferentially a touch screen. Each entertainment terminal 32 is e.g. fixed or integrated into the seat 14 of the passenger 16, or is fixed or integrated into the backrest of the seat 14 located in front of the seat 14 of the passenger 16.

Each entertainment terminal 32 is configured for delivering to the passengers 16 the content stored in the multimedia server 24, in particular, following a selection by a passenger 16 of a field displayed on the screen of entertainment terminal 32 thereof.

Each portable electronic device 34 is typically a Personal Electronic Device (PED) belonging to a passenger 16. Each portable electronic device 34 is e.g. a smartphone or an electronic tablet.

The controller 15 comprises a simulation module 40 and an allocation module 42.

The controller 15 further comprises a database 44.

The database 44 is configured for storing in memory a digital model of the mobile vehicle 10 and of the access points 26.

The numerical model comprises a three-dimensional modeling of the layout of the cabin 12.

The three-dimensional model comprises in particular, a representation of the external and internal walls of the mobile vehicle 10 and in particular of the cabin 12, of the seats 14 arranged in the cabin 12 and of the possible masking zones of the access points 26.

The digital model further comprises the materials used in the cabin 12, and in particular the conductivity thereof and the permeability thereof to radio waves. As an example, a metal wall significantly disturbs the transmission of radio waves. On the other hand, glass provides a relative good transmission for radio waves.

The digital model further comprises a wave diagram associated with each access point 26 and with each terminal 30. A wave diagram is a spatial representation of the angular radiation distribution of the access point 26 or of the terminal 30.

The simulation module 40 is suitable for, for each available channel and for each access point 26, simulating with the digital model, the propagation of radio signals from said access point 26 to said computer terminal 30 on said available channel.

The simulation module 40 is further suitable for determining, for each available channel, for each access point 26 and for each terminal 30, an estimated bandwidth associated with the communication between said access point 26 and said terminal 30 on said channel.

The bandwidth indicates the capacity of the network to transmit information. The bandwidth represents the volume of digital data which can be transferred between said access point 26 and said terminal 30 on said channel in a given time interval.

In an alternative embodiment, the simulation module 40 is arranged in a computer (not shown) outside the mobile vehicle 10. When the mobile vehicle 10 is an aircraft, the computer is in particular located on the ground.

The computer comprises another database suitable for storing the digital model. The database 44 arranged in the mobile vehicle 10 then does not comprise the digital model. The database 44 is suitable for storing the result of the simulations carried out by the simulation module 40 on the ground, in particular the estimated bandwidth.

The allocation module 42 is configured for allocating one of the available channels and one of the access points 26 to each terminal 30 according to the bandwidths which were estimated by an optimization algorithm. Said access points 26 and said terminal 30 are then suitable for communicating and exchanging data on said allocated channel.

The functioning of the simulation module 40 and of the allocation module 42 will be explained in more detail thereafter.

In the example shown in FIG. 2, the controller 15 comprises an information processing unit consisting e.g. of a memory and of a processor associated with the memory. The simulation module and the speech module consist each of a software, or a software brick, executable by the processor. The memory is then apt to store a receiver software, a speech-recognition software, a processing software, a surveillance software, and, as an optional addition, a transmission software and a validation software. The processor is then apt to run each of said software.

In a variant (not shown), the simulation and the speech module consist each of a programmable logic component, such as an FPGA (Field Programmable Gate Array), or further of a dedicated integrated circuit, such as an ASIC (Application Specific Integrated Circuit).

When the controller 15 consists of one or a plurality of software programs, i.e. of a computer program, same is further apt for being recorded on a computer-readable medium (not shown). The computer-readable medium is e.g. a medium apt to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card. A computer program containing software instructions is then stored on the readable medium.

Figure 4:
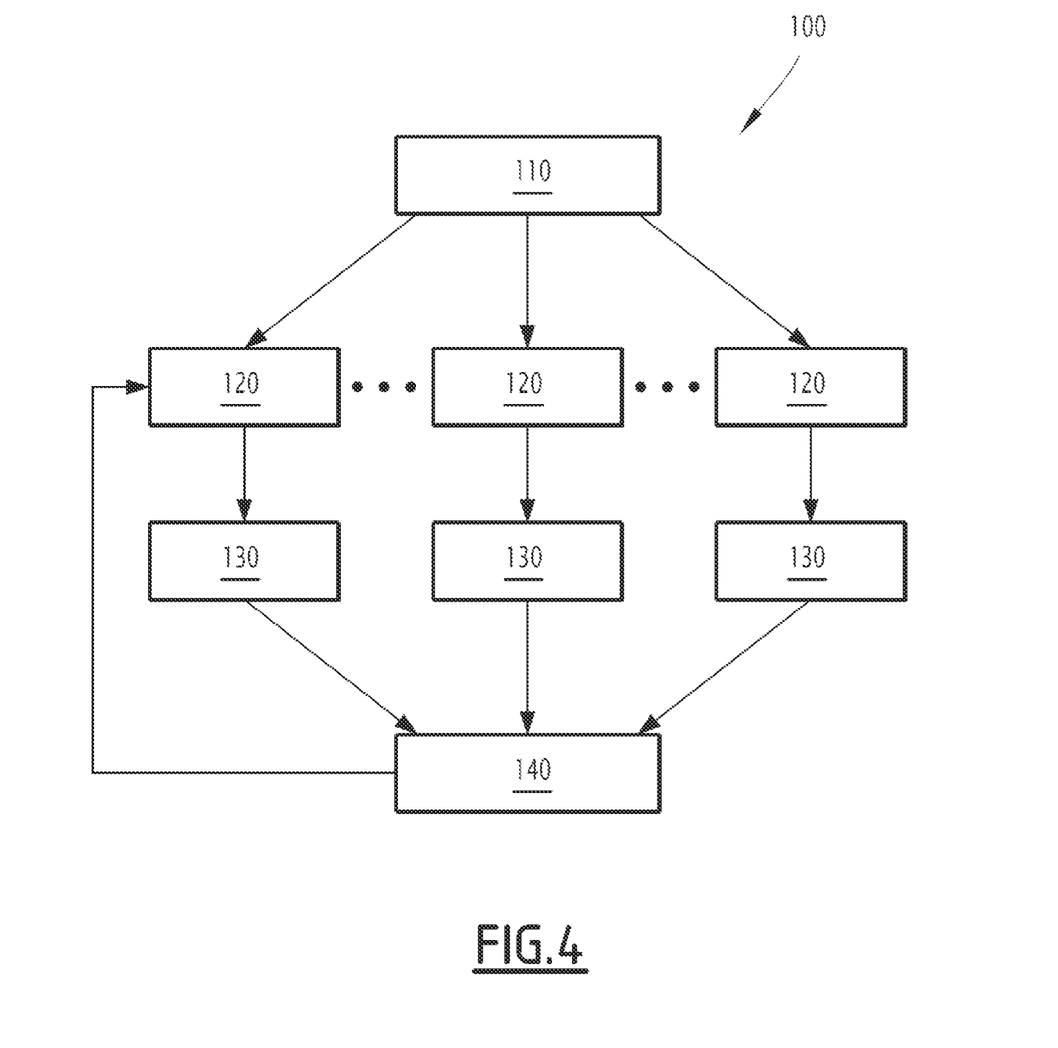
FIG. 4 is an organization chart of an allocation method according to the invention.

An allocation method 100 according to the invention will be henceforth explained with the help of FIG. 4 showing a flowchart of the allocation method according to the invention.

The method according to the invention will thereafter be described for the case of an aircraft, but a person skilled in the art would understand that such method applies in a similar manner to any mobile vehicle 10.

Initially, an aircraft including a cabin 12 for receiving passengers 16 is provided.

A digital model of the aircraft and of the wireless access points 26 arranged along the cabin, during an initial stage 110 is also provided.

As an example, in a single-aisle aircraft, the cabin 12 comprises 36 seats 14 in the so-called "Business" class and 156 seats 14 in the so-called "Economy" class. The transmission network 18 comprises 4 wireless access points 26 distributed along the cabin 12.

The allocation method 100 then comprises a simulation step 120. In particular, for each available channel and for each access point 26, a simulation 120 is carried out with the digital model of the propagation of radio signals in the aircraft 10, and in particular in the cabin 12, from said access point 26 onto said available channel.

Due to the numerical model, such simulation takes into account the precise configuration of the aircraft, and in particular the geometry thereof and the materials forming same and influencing the propagation of waves in cabin 12.

The simulation makes it possible to obtain a mapping of the power available at every point of the cabin 12, for each access point 26 and for each available channel.

Then, during a step 130, for each available channel, for each access point 26 and for each terminal 30, the method comprises a step of determining an estimated bandwidth associated with the communication between said access point 26 and said terminal 30 on said channel.

In particular, the power mapping is cross-checked with the applicable Wi-Fi standard, the intrinsic features of information encoding on the signal and in particular the choice of the modulation scheme, in order to deduce the theoretical bandwidth achievable between said access point 26 and said terminal 30 on said channel.

In one embodiment, the simulation step 120 is performed on a computer located outside the aircraft. The simulation step is performed upstream of the aircraft flight. The computer is in particular located on the ground and makes it possible in particular to have a high computing power. Furthermore, it is possible to run the simulations several times by modifying the desired model or optimization criteria.

All the estimated bandwidths are then stored on a memory on-board the aircraft.

As a variant, the simulation step 120 is carried out on a computer on-board the aircraft, in particular, during the flight of the aircraft. In such case, it is possible to carry out a more dynamic simulation taking into account the real situation on-board the aircraft, in particular the number of passengers 14 and of terminals 30 present in the cabin 12.

The method then comprises a step 140 of allocation of one of the available channels and of one of the access points 26 to each terminal 30 according to the bandwidths which were estimated by an optimization algorithm.

The optimization algorithm includes in particular, the application of a degradation coefficient to each estimated bandwidth. The degradation coefficient is a function of the number of terminals 30 connected to the access point 26 associated with said estimated bandwidth. Such degradation coefficient reflects the behavior of terminals 30 of the access point 26 as a function of density. The degradation coefficient is directly related to the intrinsic technical characteristics of the access point 26.

Figure 3:
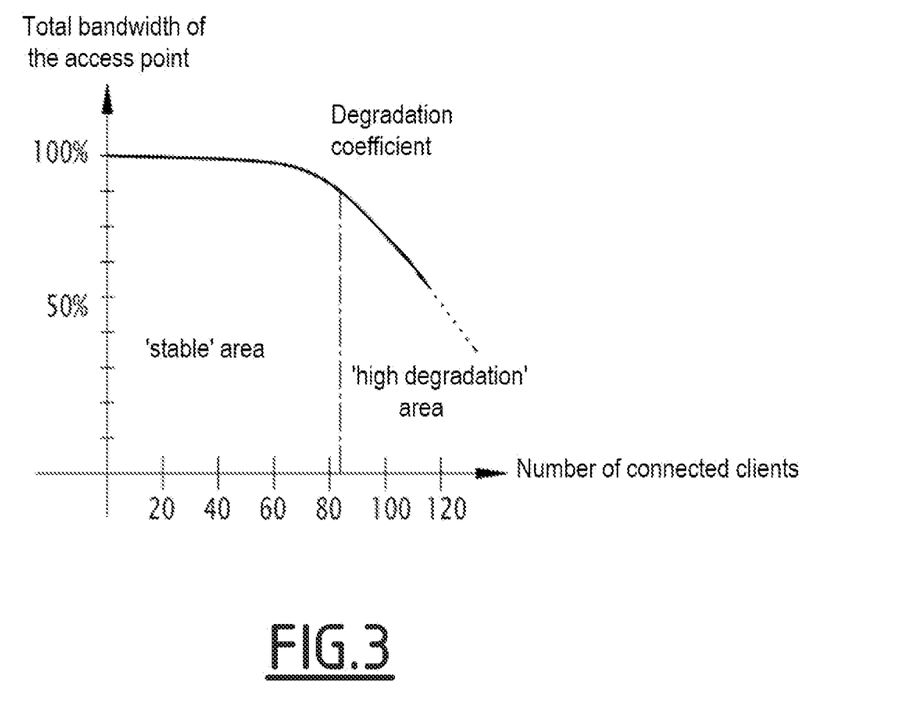
FIG. 3 is a graph showing the degradation coefficient of a bandwidth as a function of the number of connected terminals.

As an example, FIG. 3 shows the degradation coefficient as a function of the number of terminals 30 connected. When no terminal 30 is connected, the coefficient is equal to 100% and thus no degradation is applied to the estimated bandwidth. When more than 80 terminals 30 are connected, a coefficient of 90% is applied to the estimated bandwidth. When more than 120 terminals 30 are connected, a coefficient of 50% is applied to the estimated bandwidth.

The optimization algorithm allows the channels and access points 26 to be allocated to the different terminals 30 by applying an optimization criterion.

In one variant, the optimization criterion aims to maximize the average bandwidth for all terminals 30. In other words, the optimization criterion aims to ensure that, on average, each terminal 30 has as much available bandwidth as possible.

In a variant, the optimization criterion aims to maximize the average bandwidth for all the terminals 30, assuming that one of the access points 26 is down. In other words, the optimization criterion then makes it possible to take into account, a possible failure of an access point and makes it possible to determine an allocation for limiting the degradation of the service for the terminals 30.

In a variant or in addition, the optimization criterion aims to guarantee a minimum bandwidth for a predetermined subset of terminals 30 and then to maximize the average bandwidth for all terminals 30. The predetermined subset of terminals 30 is e.g. the "Business" class. The optimization criterion makes it possible e.g. to ensure a minimum of 2 Mbit/s for each terminal 30 present in the "Business" class. Then, the optimization criterion aims to ensure that all terminals 30 have the largest available bandwidth, with the constraint relating to the "Business" class. As another example, in the event of a failure of one of the access points 26, in order to limit the degradation of the service for the "Business" class, the optimization criterion makes it possible to ensure a minimum of 500 Kbit/s for each terminal 30 present in the "Business" class.

In a variant or in addition, the optimization criterion aims to maximize the average bandwidth for all terminals 30 with a predetermined maximum standard deviation. In other words, the optimization criterion aims at an equal allocation of channels and access points, with a predetermined maximum allowed standard deviation. The lower the maximum allowed standard deviation, the more equal the bandwidth distribution will be between the different terminals.

In an advantageous embodiment, the allocation is made as a function of the level of filling of the aircraft, in particular of the number of terminals 30 present in the aircraft.

Indeed, filling rates fluctuate according to flights. In order to optimize performance, configurations are calculated according to the different filling levels of the "Business" class and of the "Economy" class. Configuration means a set of assignments between the access points 26, the channels, and the terminals 30.

As shown in Table 1 below, optimal configurations are calculated based on the number of passengers 16 in each class. Herein, fifteen configurations are pre-calculated upstream of the flight. Depending on the number of passengers 16 connected in each class, the controller 15 selects and applies the configuration pre-calculated during step 130.

E.g. if during the flight, fifteen passengers of the "Business" class and one hundred and five passengers 16 of the "Economy" class connect, then the controller 15 applies the configuration Conf-9. Thus, the access points 26 and the channels are assigned to the different terminals 30 according to said configuration.

TABLE 1

| | Number of passengers in Economy Class | | | | |
|---|---|---|---|---|---|
| | 0-30 | 30-60 | 60-90 | 90-120 | 120-156 |
| Number of passengers in Business Class | 0-10 Conf-1 | Conf-2 | Conf-3 | Conf-4 | Conf-5 |
| | 10-20 Conf-6 | Conf-7 | Conf-8 | Conf-9 | Conf-10 |
| | 20-36 Conf-11 | Conf-12 | Conf-13 | Conf-14 | Conf-15 |

Advantageously, all the pre-calculated configurations (Conf-1; . . . ; Conf-15) observe the minimum speed of 2 Mbit/s for each terminal of the "Business" class which represented a limit case since the configuration was calculated for a full aircraft. Such configurations make it possible to obtain more resources (i.e. speed) for each terminal than in the case of a full aircraft.

In addition (not shown), the table is completed in order to predict the failure of one of the access points 26 by adding to the above table, a dimension representing the "no failure" case and the cases of failure of each one of the access points 26. In the case of a single-aisle aircraft, the above situation would form a set of 75 configurations to be applied according to the number of passengers 16 in "Economy" class, the number of passengers 16 in "Business" class and the possible failure of one of the access points 26.

The allocation algorithm is advantageously implemented by means of a combinatorial optimization algorithm, e.g. by means of the so-called greedy algorithm.

Alternatively, in an advantageous embodiment, the optimization algorithm is executed by means of a machine learning method trained on a database comprising the estimated bandwidths. The machine learning method is e.g. a neural network or another equivalent model. The machine learning method is trained on the basis of the simulations carried out during the step 120. Advantageously, the model obtained is on-board the mobile vehicle 10 and continues to learn with measurements made under dynamic conditions in the cabin 12 during the flight.

Such model takes as input, the data (e.g. the number of passengers) which will influence the maximum speeds and supplies as output, a table of the maximum speeds per terminal 30.

Initially, the model is configured for providing exactly the same results as the simulation carried out in the step 120 with the numerical model of the cabin 12. Then, depending on the maximum speeds observed during actual flights, the model is adapted to best reflect the maximum achievable speeds.

E.g. depending on the number of passengers 16 and the duration of the flight, the luggage compartments are filled to a greater or lesser extent, which modifies the propagation of Wi-Fi waves and hence influences the maximum achievable speeds. Such an approach makes it possible to adapt the maximum speed tables and thus the allocation of the access points 26 and of the channels according to the conditions of the flight.

In an advantageous embodiment, the allocation step 140 is carried out dynamically during the flight of the aircraft in order to adapt to the real situation of the cabin 12.

The allocation step 140 is then implemented in the aircraft. The controller 15 dynamically adapts the configuration of the channels and of the access points 26 according to the actual connections of the terminals 30 in the cabin 12. Thus, during a flight of the aircraft, according to the changes in the connections, the algorithm recalculates a new configuration which is applied and replaces the old configuration.

In particular, the triggering of the new iteration of the step of determination of a new configuration is carried out periodically, e.g. each ten minutes.

In a variant, the triggering of the new iteration is carried out following a significant change in the number of connections. E.g. a first configuration is calculated with fifty terminals 30 connected. As long as the number of connections remains within the interval between forty and sixty connections, the controller 15 does not launch a new iteration of the allocation step 140. When the number of connections falls below forty or raises above sixty, the controller 15 launches an allocation step 140 in order to obtain a new allocation more suitable for the current situation in the cabin 12.

In a variant, the triggering of the new iteration is carried out following a change in the quality of the connections of the terminals 30. In particular, a monitoring of the quality of the connections is carried out and sent back to the controller 15. When the quality of the connections deteriorates, in particular when the average speed per terminal 30 falls below a predetermined threshold or when a predetermined number of terminals has a speed below a threshold, the controller launches a new iteration of the allocation step 140.

Following the allocation, the passengers 16 have access to the IFC or IFE resources via the associated terminal 30 thereof which communicates with the access point 26 allocated on the allocated channel.

It can be understood that the invention has a certain number of advantages.

The allocation method according to the invention can be used for a better allocation of the different wireless channels and access points 26 available in the cabin 12, taking into account the particularities of the mobile vehicle 10.

Simulation by means of a numerical model makes it possible to take into account the geometry of each cabin 12, the location of the different access points 26 and terminals 30 in the cabin 12, the masking zones and the materials used which can disturb the propagation of the waves to the various terminals 30.

The invention can then be used for efficiently allocating the access points 26 and the channels according to the optimization criterion chosen for the allocation.

The invention can be further used for obtaining an allocation of Wi-Fi resources according to a minimum level of service defined a priori according to the category of passengers. It is in particular [possible] to guarantee a minimum bandwidth a priori, which is impossible with conventional methods. The invention is thus particularly advantageous when the IFC or IFE supplier commits to a quality experience for every passenger. In particular, the invention makes it possible to allocate additional resources to a particular category (e.g. the "Business" class) in order to guarantee a higher-quality service for said category of passengers.

The invention further makes it possible to define a priori, a minimum service in the event of a failure of one of the access points 26, and in particular to limit the impact on a certain category of passengers.

The invention claimed is:

1. An allocation method in a data transmission network on-board a mobile vehicle for transporting passengers, the transmission network comprising a plurality of wireless access points, each access point being configured for transmitting and receiving, on one functioning channel among a plurality of available channels, radio signals between said access point and a plurality of terminals on-board the mobile vehicle, the allocation method comprising the following steps:
provision of a digital model of the mobile vehicle and of the access points;
for every available channel and for every access point, simulation with the digital model of the propagation of radio signals in the mobile vehicle from said access point on said available channel;
for each available channel, for each access point and for each terminal, determination of an estimated bandwidth associated with the communication between said access point and said terminal on said channel according to the simulation associated with said access point and said channel;
allocation of one of the available channels and one of the access points to each terminal according to the bandwidths which were estimated by an optimization algorithm.

2. The allocation method according to claim 1, wherein the mobile vehicle is an aircraft.

3. The allocation method according to claim 1, wherein each wireless access point is configured for communicating with the terminals according to the Wi-Fi protocol.

4. The allocation method according to claim 1, wherein each terminal is chosen from the group consisting of:
a fixed entertainment terminal of the mobile vehicle; and
a portable electronic device.

5. The allocation method according to claim 1, wherein the communication network comprises at least one computer system chosen from the group consisting of:
a communication system with an antenna arranged outside the mobile vehicle; and
a multimedia server on-board the mobile vehicle.

6. The allocation method according to claim 1, wherein the mobile vehicle comprises a passenger cabin, the digital model comprising:

a three-dimensional modeling of the layout of the cabin and the materials used in the cabin; and
a wave diagram associated with each access point and with each terminal.

7. The allocation method according to claim 1, wherein the optimization algorithm comprises the application of a degradation coefficient to each estimated bandwidth, the degradation coefficient being a function of the number of the terminals connected to the access point associated with said estimated bandwidth.

8. The allocation method according to claim 1, wherein the optimization algorithm applies an optimization criterion chosen from the group consisting of:
maximizing the average bandwidth for all terminals;
maximizing the average bandwidth for all terminals assuming that one of the access points is down;
guaranteeing a minimum bandwidth for a predetermined subset of terminals and then maximizing the average bandwidth for all terminals;
maximizing the average bandwidth for all terminals with a predetermined maximum standard deviation.

9. The allocation method according to claim 1, wherein the simulation step takes place:
on a computer placed outside the mobile vehicle, all the estimated bandwidths being stored on a memory on-board the mobile vehicle; and/or
on a computer on-board the mobile vehicle.

10. The allocation method according to claim 1, wherein the optimization algorithm is executed by means of a machine learning method trained on a database comprising the estimated bandwidths.

11. The allocation method according to claim 10, wherein the database in addition comprises bandwidths measured in the mobile vehicle.

12. A non-transitory computer program comprising software instructions which, when being executed by a computer, implements an allocation method according to claim 1.

* * * * *